United States Patent
Herden et al.

(10) Patent No.: US 6,832,588 B2
(45) Date of Patent: Dec. 21, 2004

(54) FUEL INJECTOR-SPARK PLUG COMBINATION

(75) Inventors: Werner Herden, Gerlingen (DE); Dieter Volz, Heilbronn (DE); Gernot Wuerfel, Vaihingen/Enz (DE); Anja Melsheimer, Stuttgart (DE); Simon Schmittinger, Renningen (DE); Rainer Norgauer, Ludwigsburg (DE); Rene Deponte, Dettenhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/470,524

(22) PCT Filed: Nov. 25, 2002

(86) PCT No.: PCT/DE02/04315

§ 371 (c)(1),
(2), (4) Date: Dec. 16, 2003

(87) PCT Pub. No.: WO03/054380

PCT Pub. Date: Jul. 3, 2003

(65) Prior Publication Data

US 2004/0089263 A1 May 13, 2004

(30) Foreign Application Priority Data

Dec. 6, 2001 (DE) .......................... 101 59 908

(51) Int. Cl.⁷ ................................. F02F 7/00

(52) U.S. Cl. ............................. 123/193.3; 123/193.1; 123/193.5; 123/305

(58) Field of Search .................. 123/305, 294, 123/193.5, 193.3, 193.1, 193.2

(56) References Cited

U.S. PATENT DOCUMENTS

| 3,507,262 A | 4/1970 | Stage |
| 4,446,830 A | 5/1984 | Simko et al. |
| 6,055,955 A | 5/2000 | Benedikt et al. |

FOREIGN PATENT DOCUMENTS

| EP | 0 661 446 | 7/1995 |
| GB | 637584 | 5/1950 |
| JP | 6-123270 | 5/1994 |

Primary Examiner—Bibhu Mohanty
(74) Attorney, Agent, or Firm—Kenyon & Kenyon

(57) ABSTRACT

A fuel injector-spark plug combination includes a fuel injector for the direct injection of fuel into a combustion chamber of an internal combustion engine, and a spark plug for igniting the fuel injected into the combustion chamber, and has a spark-plug insulator including a first electrode, and includes a second electrode. The fuel injector and the spark-plug insulator of the spark plug are each disposed in a recess of a cylinder head of the internal combustion engine. The fuel injector and the spark-plug insulator of the spark plug are fixedly held in place in a shared connecting member arranged outside of the cylinder head.

9 Claims, 1 Drawing Sheet

FUEL INJECTOR-SPARK PLUG COMBINATION

FIELD OF THE INVENTION

The present invention is based on a fuel injector-spark plug combination.

BACKGROUND INFORMATION

A fuel injector including an integrated spark plug is described in European Published Patent Application No. 0 661 446. The fuel injector with the integrated spark plug is used for the direct injection of fuel into the combustion chamber of an internal combustion engine and for igniting the fuel injected into the combustion chamber. By the compact integration of a fuel injector with a spark plug, it is possible to save installation space at the cylinder head of the internal combustion engine. The conventional fuel injector with integrated spark plug includes a valve body which, together with a valve-closure member able to be actuated by manner of a valve needle, forms a sealing seat, adjacent to which is a spray-discharge orifice, which discharges at an end face of the valve body facing the combustion chamber. A ceramic insulation element insulates the valve body from a housing body in a high-voltage proof manner, the housing body being able to be screwed into the cylinder head of the internal combustion engine. Located on the housing body is a ground electrode in order to form an opposite potential to the valve body acted upon by high voltage. In response to a sufficiently high voltage being applied to the valve body, a spark arc-over occurs between the valve body and the ground electrode connected to the housing body.

This conventional fuel injector with the integrated spark plug provides that the position of the spark arc-over is not defined with respect to the fuel jet spray-discharged from the spray-discharge orifice, since the spark arc-over may occur at just about any location in the lateral region of a valve-body projection. With this configuration, a reliable ignition of the so-called jet root of the fuel jet spray-discharged from the spray-discharge orifice is not possible with the necessary reliability. However, a reliable and temporally precisely defined ignition of the fuel jet is absolutely required for reduced emissions. Furthermore, the exit orifice of the fuel jet may be subject to continually worsening carbon fouling or coking, which affects the form of the spray-discharged jet. The ceramic extrusion coat is relatively cost-intensive.

SUMMARY

The fuel injector-spark plug combination according to an example embodiment of the present invention may provide that, by positioning the fuel injector and the spark-plug insulator of the spark plug in a shared connecting member, which may be arranged at an end face of the cylinder head of the internal combustion engine, the components may be optimally arranged relative to each other, resulting in a system that is easy to install and requires little space.

The spark-plug insulator may be secured in the housing by a threaded sleeve, the spark-plug insulator being screwed into the mounting support.

Tilting of the longitudinal axis of the spark-plug insulator relative to the longitudinal axis of the fuel injector may prevent the spark plug from being directly exposed to the fuel jet spray-discharged from the fuel injector.

Moreover, the spark plug and the ground electrode of the spark plug may each be exchangeable independently of the fuel injector.

The housing may be made of plastic and may be produced in an inexpensive manner.

An example embodiment of the present invention is represented in the drawing in schematic form and explained in greater detail in the following description.

DETAILED DESCRIPTION

Figure 1:
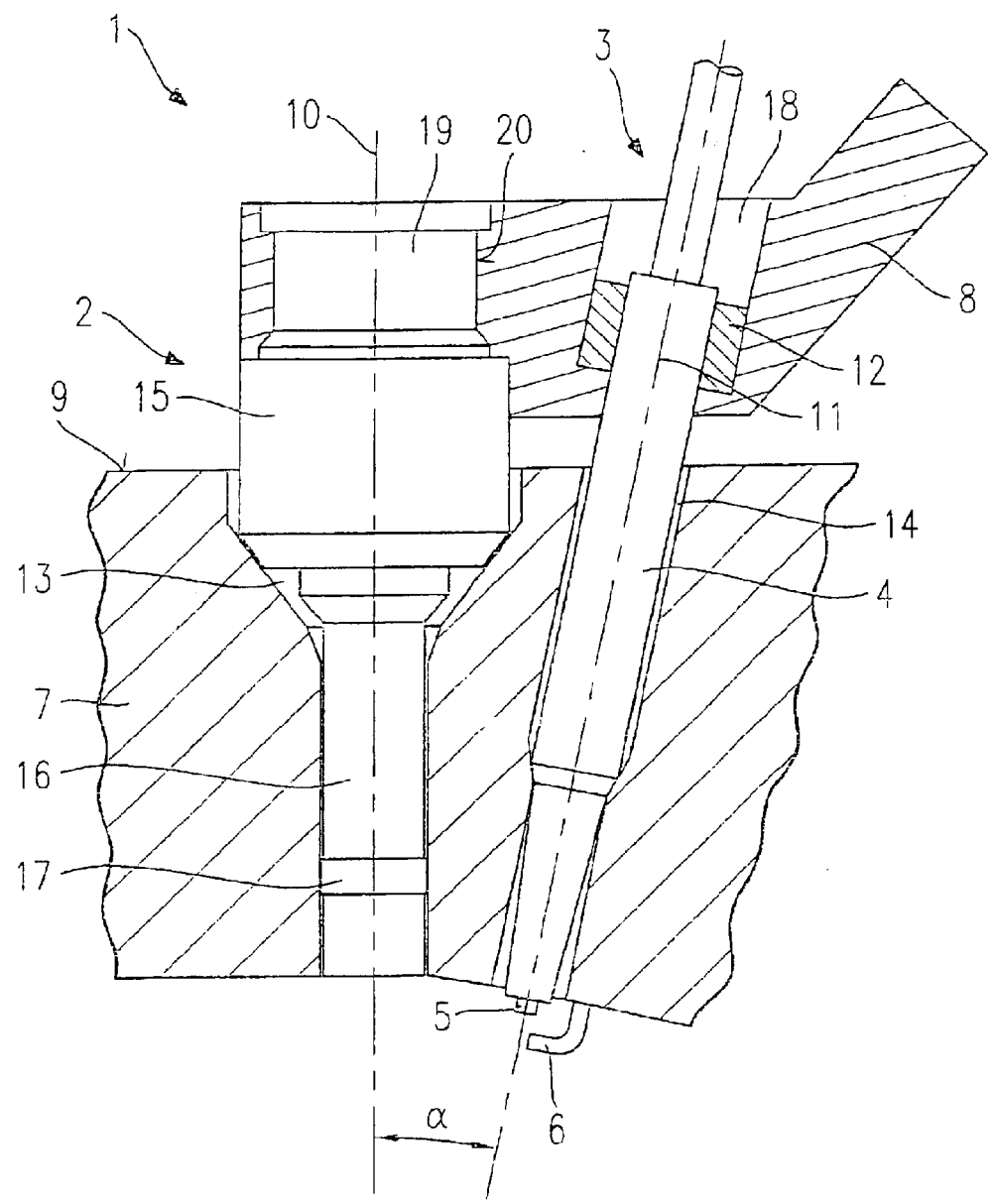
FIG. 1 illustrates a section through an example embodiment of a fuel injector/spark plug combination configured according to the present invention.

FIG. 1 illustrates a fuel injector-spark plug combination 1 including a fuel injector 2 for the direct injection of fuel into a combustion chamber of a mixture-compressing internal combustion engine having externally supplied ignition, and including a spark plug 3 for igniting the fuel injected into the combustion chamber according to an example embodiment of the present invention.

In this case, fuel injector 2 includes a valve housing 15 and a nozzle body 16. Fuel injector 2 is located in a first receiving bore 13 of a cylinder head 7 of the internal combustion engine and sealed from the combustion chamber of the internal combustion engine by a seal 17, for example.

Spark plug 3 has a conventional configuration and is made up of a spark-plug insulator 4, which may be made of a ceramic material, and a first electrode 5 arranged therein. First electrode 5 is electrically contactable by an ignition device and may be positioned inside spark-plug insulator 4 in a centered or asymmetrical manner. At least one second electrode 6 is arranged on cylinder head 7 of the internal combustion engine.

A connecting member 8, which accommodates fuel injector 2 and spark plug 3, is constructed in such a manner that it surrounds valve housing 15 of fuel injector 2 at least partially, fuel injector 2 being permanently integrated in connecting member 8. In the example embodiment, fuel injector 2 includes a circumferential groove 20 at a fuel inflow 19, the groove being extrusion-coated by the plastic of connecting member 8. Furthermore, connecting member 8 includes a recess 18 in which spark-plug insulator 4 of spark plug 3 may be inserted and is able to be connected to housing (connecting member) 8 in a releasable manner with the aid of a threaded sleeve or clamping sleeve 12 fixedly anchored in recess 18. Spark-plug insulator 4 is screwed or clamped into threaded sleeve or clamping sleeve 12.

Spark-plug insulator 4 of spark plug 3 extends into a second receiving bore 14 of cylinder head 7 of the internal combustion engine. Receiving bore 14 for spark-plug insulator 4 and receiving bore 13 for fuel injector 2 are biaxially arranged and may be tilted at an arbitrary angle $\alpha$, which is formed between a longitudinal axis 10 of fuel injector 2 and a longitudinal axis 11 of spark-plug insulator 4 of spark plug 3.

By a suitable selection of angle $\alpha$ and the geometry of a sealing seat and at least one spray-discharge orifice of fuel injector 2 and/or of the injection jet, an optimal ignition of the mixture cloud injected into the combustion chamber is able to be ensured, with spark plug 3 being subjected to minimal thermal shock, so that the fuel consumption and the emissions of the internal combustion engine are influenced in an effective manner.

The connecting member 8 configured according to the present invention over separately installed components may provide simple installability, the possibility of a separate exchange of spark-plug insulator 4 and second electrode 6 of spark plug 3 as well as reduced installation space for spark plug 3 and fuel injector 2 in cylinder head 7 of the internal combustion engine when compared to individual components.

A coaxial arrangement of fuel injector 2 and spark plug 3 may provide increased durability Of the components and an improvement in the cold start-characteristics of the internal combustion engine, since expensive ceramic coatings will not be necessary. This also may keep the manufacturing and servicing costs low.

The present invention is not restricted to the example embodiment illustrated and is applicable to various configurations of fuel injectors and arbitrary mutual tilting angles of spark plug 3 and fuel injector 2. The rotary orientation of spark-plug insulator 4 may be defined by suitable measures, for example on threaded sleeve or clamping sleeve 12, so that unsymmetrical spark-plug insulators 4, which require an angle orientation, may be used as well.

What is claimed is:

1. A fuel injector-spark plug combination, comprising:
   a fuel injector for direct injection of fuel into a combustion chamber of an internal combustion engine;
   a spark plug configured to ignite the fuel injected into the combustion chamber, the spark plug including a spark-plug insulator including a first electrode and a second electrode, the fuel injector and the spark-plug insulator of the spark plug disposed in a recess of a cylinder head of the internal combustion engine; and
   a shared connecting member arranged outside of the cylinder head and configured to fixedly hold in place the fuel injector and the spark-plug insulator of the spark plug.

2. The fuel injector-spark plug combination of claim 1, wherein the connecting member is arranged at an end face of the cylinder head of the internal combustion engine.

3. The fuel injector-spark plug combination of claim 1, wherein the connecting member includes a plastic material.

4. The fuel injector-spark plug combination of claim 3, wherein the fuel injector, at a fuel inflow, includes a circumferential groove extrusion-coated by the plastic material of the connecting member.

5. The fuel injector-spark plug combination of claim 1, wherein a longitudinal axis of the fuel injector is tilted at an angle relative to a longitudinal axis of the spark-plug insulator of the spark plug.

6. The fuel injector-spark plug combination of claim 1, wherein the spark-plug insulator is releasably connected to the connecting member.

7. The fuel injector-spark plug combination of claim 6, wherein the spark-plug insulator is screwed into the connecting member.

8. The fuel injector-spark plug combination of claim 7, wherein the spark-plug insulator is fixedly held in place in a recess of the connecting member by one of a threaded sleeve and a clamping sleeve.

9. A fuel injector-spark plug combination, comprising:
   means for directly injecting fuel into a combustion chamber of an internal combustion engine;
   means for igniting the fuel injected into the combustion chamber, the igniting means including means for insulating including a first electrode and a second electrode, the injecting means and the igniting means disposed in a recess of a cylinder head of the internal combustion engine; and
   shared means arranged outside of the cylinder head for fixedly holding in place the injecting means and the insulating means.

* * * * *